United States Patent [19]
Duruz et al.

[11] 4,412,120
[45] Oct. 25, 1983

[54] MACHINE FOR CUTTING SHEET MATERIAL

[75] Inventors: Louis Duruz, Romanel; Alfred Furrer, Winterthur, both of Switzerland

[73] Assignee: Raskin, S.A., Cheseauz, Switzerland

[21] Appl. No.: 314,192

[22] Filed: Oct. 23, 1981

[30] Foreign Application Priority Data

Oct. 23, 1980 [CH] Switzerland ............... 7907/80

[51] Int. Cl.³ .................................. B23K 27/00
[52] U.S. Cl. ................ 219/121 LG; 219/121 LY; 219/121 FS
[58] Field of Search ............ 219/121 LG, 121 LN, 219/121 LY, 121 FS; 83/409, 435.1

[56] References Cited

U.S. PATENT DOCUMENTS

| | | | |
|---|---|---|---|
| 3,612,814 | 10/1971 | Houldcroft | 219/121 LG |
| 3,769,488 | 10/1973 | Hasslinger | 219/121 LN |
| 3,828,159 | 8/1974 | Zoot | 219/121 LN |

*Primary Examiner*—C. L. Albritton
*Attorney, Agent, or Firm*—Silverman, Cass & Singer

[57] ABSTRACT

In a machine for cutting sheet material by means of a laser beam, the sheet material is placed on a support constituted by a container which moves on a table of the machine while rolling on support balls provided on the table. Thus, the work sheet is not directly in contact with the table, which enables the cutting operation to continue without it being necessary to remove the cut-out members from the sheet as the cutting takes place, as would be the case if the sheet were to rest directly on the table, in which case the cut-out members would risk catching on the edge of an opening provided in the table in line with the axis of the laser beam.

6 Claims, 5 Drawing Figures

MACHINE FOR CUTTING SHEET MATERIAL

BACKGROUND OF THE INVENTION (a) Field of the Invention

The present invention relates to a machine for cutting sheet material by means of a laser beam.

(b) Description of the Prior Art

Known machines used for the cutting of sheet material, especially sheet iron, by means of a stationary laser beam have tables provided with an opening situated on the axis of the laser beam and over which the sheet to be cut is displaced. A result of this arrangement is that, when the cut-out worked members or the waste produced move slightly out from the plane of the rest of the sheet, they risk catching on the edge of the opening in the table during displacement of the sheet. Consequently, it is necessary to release each cut-out member as the cutting proceeds, which necessitates successive stoppages of the machine.

SUMMARY OF THE INVENTION

The object of the present invention is to remove this drawback, namely the necessity for successive stoppages of the machine.

This object is achieved by means of the fact that a cutting machine according to the invention comprises a support for the sheet to be cut which is frame shaped and itself movable opposite to a stationary working head of the machine, said support frame being arranged in such manner as to be able to receive, resting thereon, the sheet of material to be worked, the arrangement being such that the cut-out worked members or the waste do not have to be separated from the sheet during working.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENT

Figure 1:
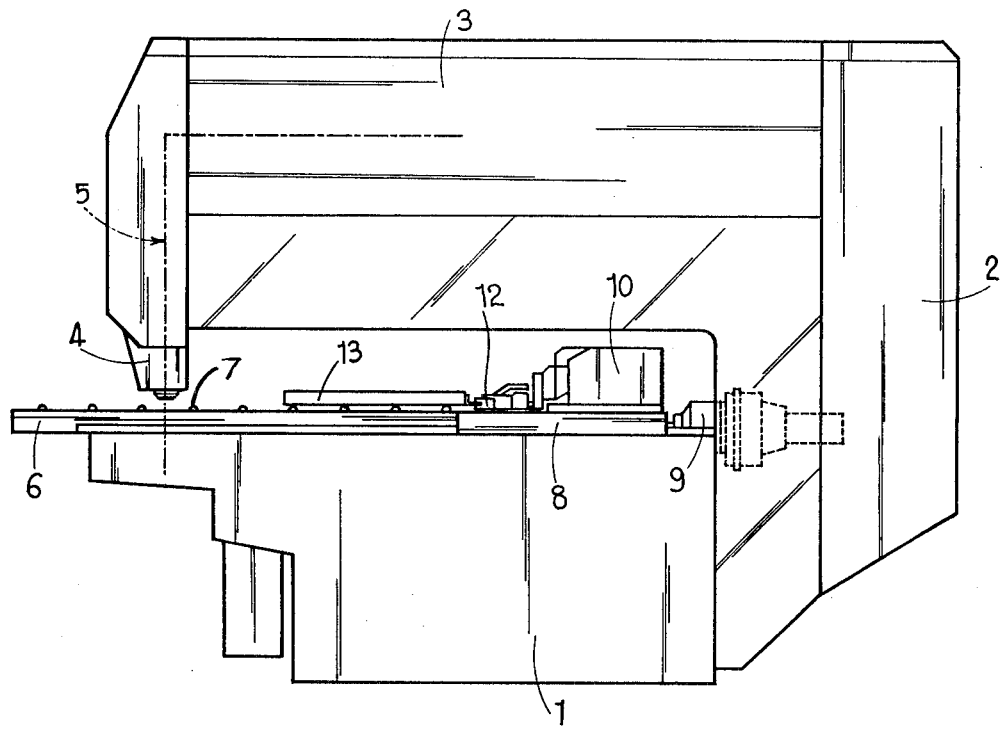
FIG. 1 is a side elevation of a cutting machine in accordance with the invention for cutting sheet material, especially for cutting sheet iron.
Figure 2:
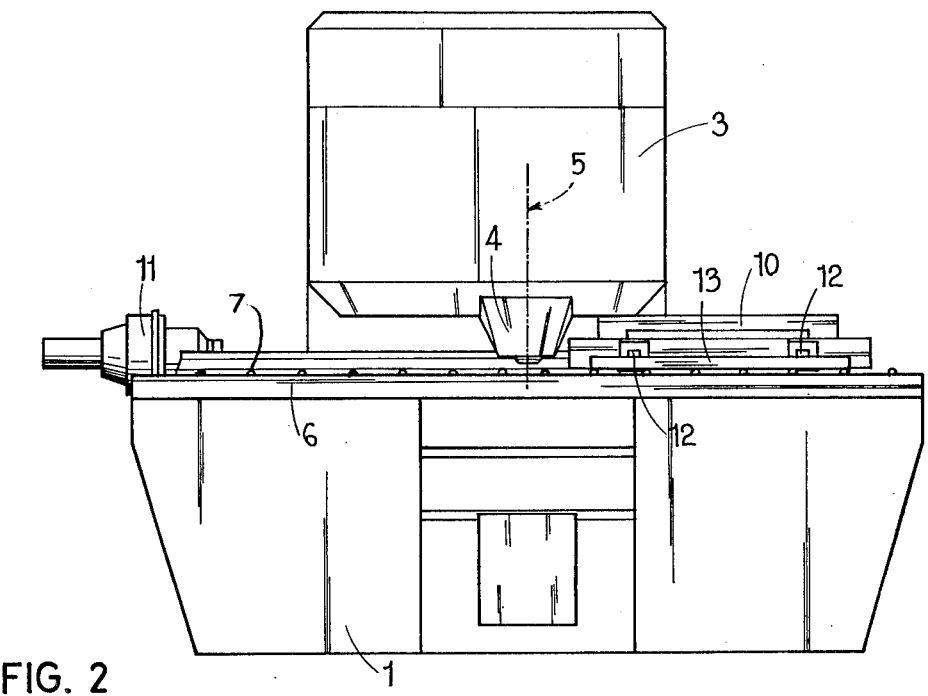
FIG. 2 is a front elevation of this machine.

The machine as described and illustrated comprises a frame 1 provided with an upright column 2 extended by a bracket 3 containing the laser generator (not shown) and at the free end of which is secured a cutting head, designated by reference 4, containing an optical element of the machine constituted by a set of lenses and by a mirror which is inclined at 45° and which deflects the initially horizontal axis of the laser beam, to render it vertical as indicated at 5.

The machine further comprises a table 6 provided with rolling support balls 7. This table is provided with an opening which is in line with the vertical axis 5 of the laser beam. The machine also comprises a longitudinal carriage 8 displacement of which is controlled by a motor 9, and a carriage 10, movable transversely on the carriage 8, the displacement of which is controlled by a further motor (not shown). The carriage 10 is provided with pincers 12 operative to grip the support of the sheet material to be worked.

Figure 3:
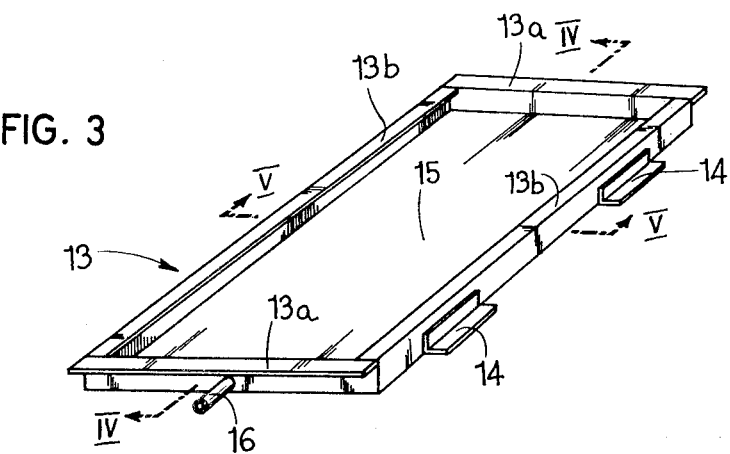
FIG. 3 is a perspective view of the container shown in FIGS. 1 and 2.
Figure 4:
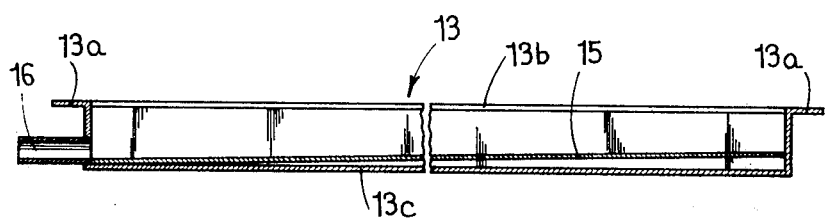
FIG. 4 is a sectional view on the line IV—IV of FIG. 3.
Figure 5:
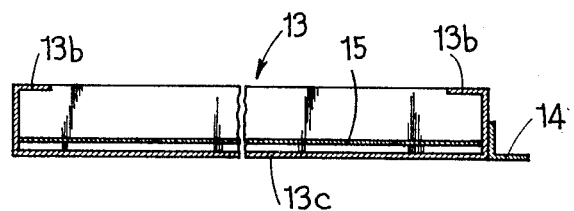
FIG. 5 is a sectional view on the line V—V of FIG. 3.

This support is constituted by a container 13 made of aluminum, a material that is not destroyed by the laser beam or only so with difficulty, and is of generally rectangular shape, being illustrated in detail in FIGS. 3 to 5. This container is provided, along its smaller sides, with two edges 13a which are bent outwardly and, along its longer sides, with two edges 13b which are bent inwardly. It carries, secured to one of its side faces, two tongues having the shape of angle bars 14 intended to be gripped by the pincers 12 like an iron sheet. The bottom 13c of the container 13 is intended to roll on the balls of the table 6 during the displacement of the carriages 8 and 10. This container will in use be provided, internally with transverse and longitudinal small bars constituting a form of grid or gratings, the dimensions of the openings of which will depend upon the dimensions of the members which it is desired to cut out from the sheet and which will serve to support the sheet of the work material, to prevent it from bending, and to retain the cut-out members which are removed therefrom.

Finally, the container 13 is provided with an inclined false bottom 15 opposite the lower part of which opens a pipe 16 serving for the evacuation of the cutting gas and of a coolant liquid for the workpiece which may, in some cases, be used. As a matter of fact, it appears that the cooling or lubrication of a work member cut by means of laser, for example with water, prevents modifications of the crystalline structure of the material as well as deformation, especially in the case of thick materials.

The sheet to be cut, an iron or other sheet, will preferably have a shape corresponding to that of the container 13 and will rest on the edges 13a and 13b of this container. A frame, not illustrated, can cover the peripheral portion of the sheet and maintain it bearing on the container.

During the cutting operation, the cut-out members or the large waste are not able to leave the plane of the sheet, being retained by said grid placed in the container. Moreover, the small waste, such as scoria or cutting calamine, for instance, will fall into the container where it can be recovered. Moreover, the cutting gas will be evacuated by a suction device connected to the pipe 16 and will not, due to this, pollute the atmosphere of the locality in which the machine is operating. The same applies for the coolant water.

The machine operator will normally have at his disposal several containers 13 which will permit him to load and unload these containers in "masked time", that is to say while the machine is operating.

In a simplified embodiment of the invention, especially when the machine comprises recovery means for the cutting gas and for the coolant water situated below the table, and in the case where the table does not comprise rolling support balls, the described container 13 can be replaced by a mere supporting frame for the work sheet, which slides on the table and prevents the members moving slightly out from the plane of the sheet from catching on the edge of the central opening 8 of the table.

It is to be noted that, although the present machine is specially designed for laser cutting of sheet material, there is nothing to prevent it from being utilized for laser boring of such a material. Moreover, this machine is suitable not only for the cutting of metallic sheet material, but also for the cutting of other sheet materials such as plastics material, glass, wood, etc.

We claim:

1. A machine for cutting sheet material by means of a laser beam, which machine comprises a movable support frame for a sheet to be cut which is movable both longitudinally and transversely relative to a supporting stationary table and opposite to a stationary working head of the machine, said support frame being arranged to receive the sheet of material to be worked, the arrangement being such that cut-out worked members or the waste do not have to be separated from the sheet during working.

2. A machine as claimed in claim 1, in which said support frame is provided, internally, with a grid for sustaining the sheet and for retaining the cut-out members.

3. A machine as claimed in claim 1, in which said support frame is provided with a bottom and comprises a container for recovering waste which becomes detached from the sheet as well as the cutting gas.

4. A machine as claimed in claim 3, in which said container is provided with a pipe for evacuation of the cutting gas.

5. A machine as claimed in claim 4, in which said container is provided with an inclined false bottom, opposite a lower part of which opens to said pipe which serves also for the evacuation of a coolant liquid for the work-piece during working thereof.

6. A machine as claimed in claim 1, in which said support frame is provided with gripping means to effect its displacement on said table of the machine.

* * * * *